(No Model.) 3 Sheets—Sheet 2.
J. F. FORD.
WIND WHEEL.
No. 561,074. Patented May 26, 1896.
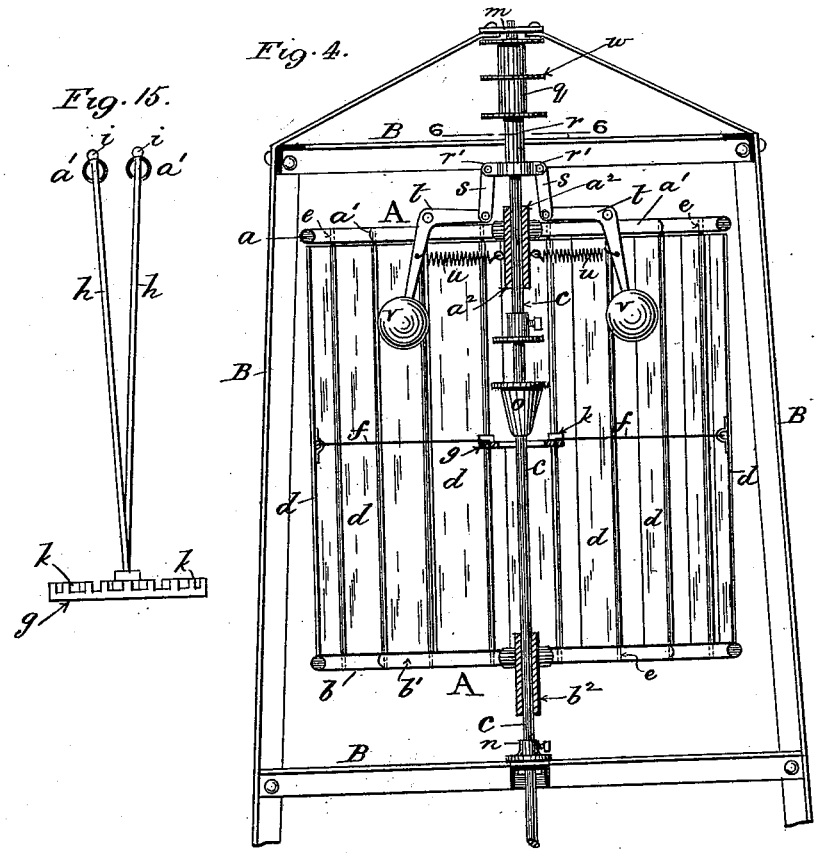
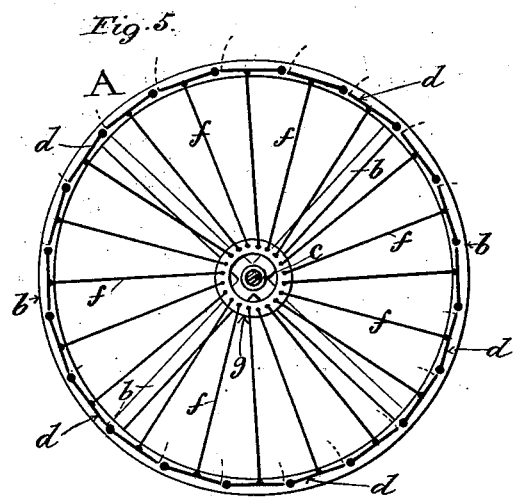
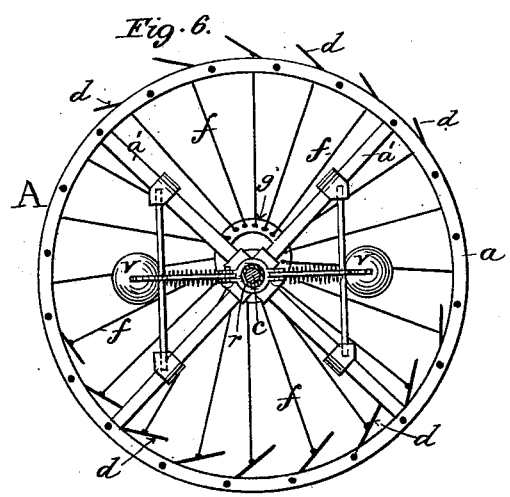
WITNESSES
Geo Bray
W. H. Cotton
INVENTOR
John Fletcher Ford
By Edward W. Furrell.
His atty (No Model.) 3 Sheets—Sheet 3.
J. F. FORD.
WIND WHEEL.
No. 561,074. Patented May 26, 1896.
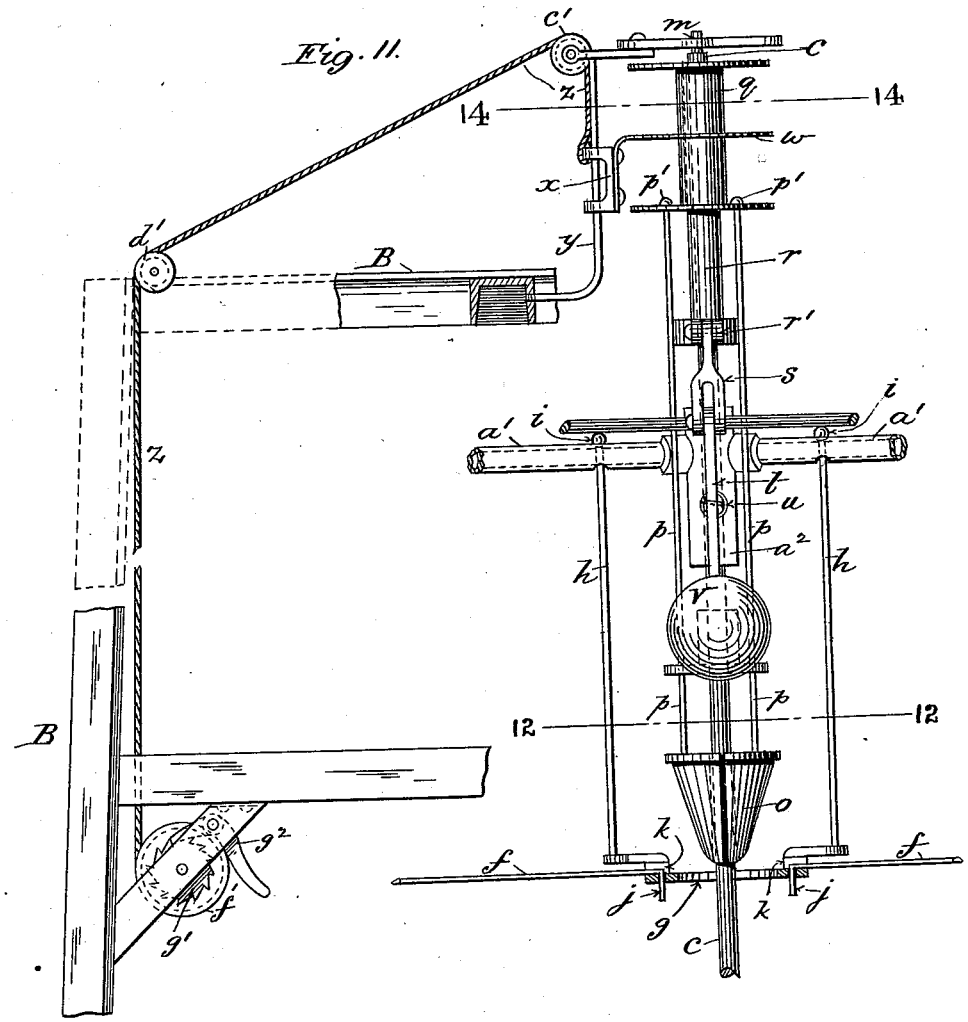
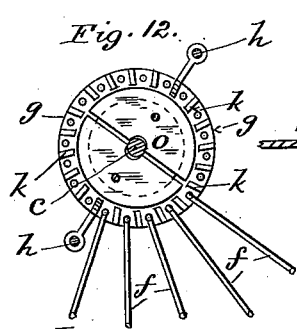
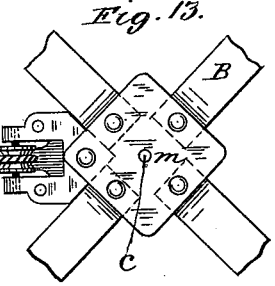
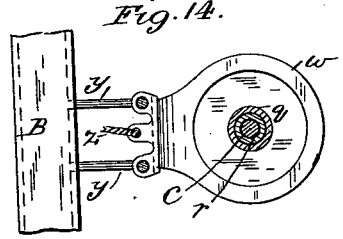
WITNESSES
Geo Bray
W H Cotton
INVENTOR
John Fletcher Ford
By Edward W Furrell
His atty

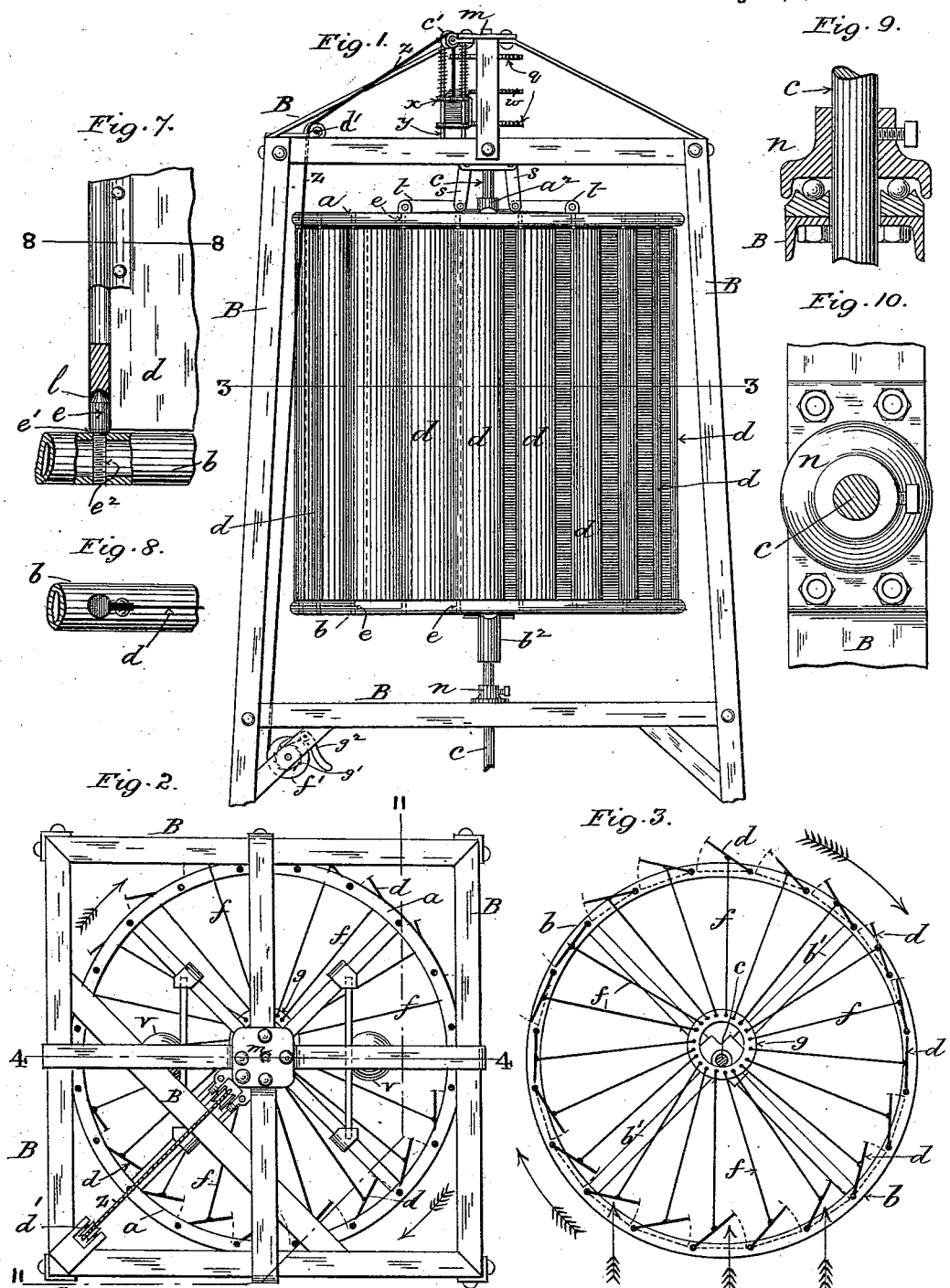

UNITED STATES PATENT OFFICE.

JOHN FLETCHER FORD, OF ST. LOUIS, MISSOURI.

WIND-WHEEL.

SPECIFICATION forming part of Letters Patent No. 561,074, dated May 26, 1896.

Application filed October 7, 1895. Serial No. 564,858. (No model.)

*To all whom it may concern:*

Be it known that I, JOHN FLETCHER FORD, residing at St. Louis, in the State of Missouri, have invented a new and useful Improvement in Wind-Wheels, of which the following is a specification.

This invention, which is in the nature of an improvement upon that for which I obtained Letters Patent of the United States, dated March 15, 1881, No. 238,880, relates to that class of windmills in which the wind-wheel is mounted on a vertical shaft; and the invention has for its object to increase the power and obtain more regular motion of the wheel, to automatically control its speed, and to provide a pivot bearing or hinge for the vanes which will diminish friction and afford protection thereat from rain and frost.

The invention consists in features of novelty, as hereinafter described and claimed, reference being had to the accompanying drawings, forming part of this specification, wherein—

Figure 1 is a windward side elevation of my improved wind-wheel; Fig. 2, a plan thereof; Fig. 3, a horizontal section through the wheel, vanes, and shaft on line 3 3 in Fig. 1; Fig. 4, a vertical section through the wheel and its outer supporting-framework on line 4 4 in Fig. 2; Fig. 5, a similar view to Fig. 3, showing the vanes closed when unaffected by the wind; Fig. 6, a horizontal section on line 6 6 in Fig. 4, omitting the outer frame; Fig. 7, a detail side elevation, to enlarged scale, of one of the pivotal bearings or hinges of the vanes, showing its attachment to the wheel-rim; Fig. 8, a horizontal section on line 8 8 in Fig. 7; Fig. 9, a detail vertical section, to enlarged scale, of the lower bearing for the vertical wind-wheel shaft seen in Figs. 1 and 4; Fig. 10, a plan thereof. Fig. 11 is a sectional elevation, to enlarged scale, taken on line 11 11 in Fig. 2, showing the internal mechanism of the wind-wheel as partly seen in Figs. 1, 2, 3, 4, 5, and 6, respectively; Fig. 12, a horizontal section on line 12 12 in Fig. 11, showing the central ring and its attachments, forming parts of my invention; Fig. 13, a plan, to enlarged scale, of the top bearing-plate for the wind-wheel shaft; Fig. 14, a horizontal section on line 14 14 in Fig. 11; and Fig. 15, a detached side view, taken at right angles to that seen in Fig. 11, of the central ring and its supporting-rods.

Like letters of reference denote like parts in all the figures.

A represents my improved wind-wheel, which consists of an upper circular rim $a$ and a lower circular rim $b$, arranged horizontally and having, respectively, arms or spokes $a'$ $b'$ and central hubs $a^2$ $b^2$, by which the rims $a$ $b$ are fixed on the vertical shaft $c$; or in lieu of the rims $a$ $b$ circular plates or disks having central hubs may be used.

Between and consecutively around the rims $a$ $b$ are arranged a series of vertical vanes $d$, which are provided, preferably at or near one of their longitudinal or vertical edges, with top and bottom pivot-pins $e$, whereby the vanes $d$ are hinged to the rims $a b$ and adapted to swing freely outward and inward therefrom, as hereinafter more particularly referred to.

To the inner side of each vane $d$ is jointed the outer end of a rod $f$, having its inner end hooked or otherwise jointed to a preferably flat circular ring $g$, which horizontally surrounds, but is unconnected with, the vertical shaft $c$. When the wheel A is unaffected by the wind, the ring $g$ is concentric with or radially equidistant from the shaft $c$, in which position the vanes $d$ will be alined to each other around the rims $a$ $b$, or so as to circumferentially close the wheel A, as seen in Fig. 5; but when the wind is blowing on the wheel A—say in the direction of the vertical arrows seen in Fig. 3—the vanes $d$ on the windward side are forced inward radially to their hinges $e$, and by means of their connecting-rods $f$ push over the ring $g$ toward the leeward side until stopped by the vertical shaft $c$, with which the ring $g$ consequently assumes and maintains during the action of the wind an eccentric form, which causes the vanes $d$ on the leeward side to be forced outward by their rods $f$ to the same extent as the windward vanes $d$ are forced inward, the relative positions of the various vanes $d$ being obedient to the eccentricity of the ring $g$—that is to say, the extent of opening of the vanes $d$ on each side of the central vane facing the wind (all the rods $f$ being of equal length) will respectively decrease, until at the middle of the wheel A or neutral line between windward and leeward the opposite vanes $d$ will be closed or alined to the rims $a\ b$. In this position of the vanes $d$ the wheel A is caused to rotate in the direction of the circular arrows seen in Figs. 2 and 3 by the action of the wind on the windward vanes $d$ when passing into the wheel A, and again on the leeward vanes $d$ when leaving the wheel A, whereby greater power is obtained. Moreover, by the continued regular adjustment of the vanes $d$ to their proper extent of opening by the eccentric action of the ring $g$ the maximum effect of the wind on each vane $d$ is utilized, the wind passing freely through and out of the wheel A without hindrance from reflex or counter currents of the wind, which is apt to occur when each vane $d$ has the same extent of opening.

For insuring a positive thrust of the vanes $d$ on the ring $g$ in the direction of rotation the connecting-rods $f$ are alined tangentially to the shaft $c$, and in addition thereto the ring $g$ is attached to the lower ends of two or more oppositely-inclined supporting-rods $h$, (see particularly Figs. 11 and 15,) which depend, preferably, from the spokes $a'$ of the rim $a$, to which the rods $h$ are held at their upper ends by ball-bearings $i$ or other suitable device for allowing lateral play to the rods $h$ and ring $g$ in every direction.

On the upper surface of the ring $g$, intermediate to the joints $j$, respectively, of the rods $f$, Figs. 4, 11, 12, and 15, are projections $k$, which act as stops to the undue side play of the rods $f$ thereat, and so maintain the proper position of the ring $g$ relatively to the rods $f$ and vanes $d$ at all times. These stops $k$ are omitted from Figs. 2, 3, 5, and 6 to avoid obscurity.

The rims $a\ b$ of the wheel A are preferably circular in cross-section and may be composed of metal rods or pipes, such as gas-pipe, connected to the spokes and hubs $a'\ a^2\ b'\ b^2$ in any convenient manner.

Each pivotal bearing or hinge of the vanes $d$ consists, preferably, of a circular pin $e$, Fig. 7, having a bottom shoulder $e'$ and a threaded shank $e^2$, which is screwed into the rim $b$ (or $a$) of the wheel A, the shoulder $e'$ bearing against the circumference of the rim $b$. The pin $e$ is inserted within a socket $l$, formed in the lower portion of the vertical edge of the vane $d$, the conical top of the pin $e$ engaging in a corresponding cavity formed in the closed upper end of the socket $l$, so that the lower horizontal edge of the vane $d$ will be somewhat clear of the rim $b$ and thereby allow of the free movement of the vane $d$ in swinging to and fro over the rim $b$. By this construction the bearing of the vane $d$ on its hinge $e$ is inaccessible to rain or snow, which, owing to the circular sectional form of the rims $a\ b$, cannot effect a lodgment thereon or interfere with the free movement of the vanes $d$.

The vertical shaft $c$ has its upper bearing $m$ in the top of the outer framework B, which may be of any suitable construction and open on all sides for allowing free access of the wind to the wheel A from every direction.

To the framework B, beneath the wind-wheel A, is fixed the bearing $n$ of the shaft $c$. The bearing $n$ may be of any suitable well-known construction, but preferably a ball-bearing such as that shown in Figs. 9 and 10, whereby the rotation of the shaft $c$ is accomplished with the least friction.

For regulating the speed of the wind-wheel A, I preferably use a device consisting of a cone $o$, Figs. 4 and 11, which surrounds and is adapted to slide longitudinally on the vertical shaft $c$, with its small end toward and adjacent to the ring $g$. The cone $o$ is divided longitudinally, for the purpose hereinafter described, into two or more parts, to each of which, at its upper or larger end, is attached the lower end of a rod $p$, which extends upward and passes freely through a hole in the lower end or flange of a bobbin-like sleeve $q$, the upper end of the rod $p$ having a head $p'$, which normally bears on the said flange. The sleeve $q$ is frictionally held to and adapted to slide longitudinally on an inner sleeve $r$, which is rotated by the shaft $c$, and at the same time adapted to slide longitudinally thereon, by means of a feather-key or otherwise.

From the lower end of the inner sleeve $r$, below the sleeve $q$, project two opposite horizontal arms $r'$, to which are jointed depending links $s$, coupled at their lower ends, respectively, to the horizontal arms of two opposite bell-crank levers $t$, which are fulcrumed, preferably, to the spokes $a'$ of the rim $a$, the depending arms of the levers $t$ being connected by horizontal springs $u$ to the hubs $a^2$ of the rim $a$ and having balls $v$ fixed to their lower ends.

Between the upper and lower ends or flanges of the outer sleeve $q$ is located a horizontal ring $w$, which surrounds the sleeve $q$ at a suitable distance therefrom and is attached outwardly to a block or carriage $x$, which is adapted to slide vertically on guides $y$, fixed to the outer framework B. To the carriage $x$ is fixed one end of a cord $z$, which passes over an overhead pulley $c'$ and thence outward over a pulley $d'$ at the side of the framework B, downward to a pulley-wheel $f'$, which is axially mounted at any convenient part of the mill and is provided with a ratchet-wheel $g'$ and pawl $g^2$ or other suitable locking device and with a handle, (not shown,) whereby on turning the pulley-wheel $f'$ in either direction the carriage $x$, with the ring $w$, may be raised or lowered accordingly and locked at any desired height.

In operation, assuming the various parts here described to be in the position shown by full lines in Figs. 4 and 11 and the ring $g$ in the position shown by Fig. 3, on the speed of the wind-wheel A becoming excessive the centrifugal force will diverge the balls $v$, and in so doing lower the inner sleeve $r$, and with it the frictionally-held outer sleeve $q$, and thereby allow the cone $o$ to drop, so that its small end passes between the shaft $c$ and ring $g$ at their point of contact, Fig. 3, and by thus separating the ring $g$ from the shaft $c$ the vanes $d$ are gradually closed to the action of the wind and the speed of the wheel $a$ correspondingly reduced until the normal speed is again reached, when the balls $v$ will fall and gradually raise the sleeve $q$ and cone $o$ toward their original position. On raising or lowering the outer sleeve $q$, and with it the cone $o$, by the ring $w$ any desired extent of opening can be given to the vanes $d$ and the speed of the wheel A regulated accordingly. When desired to stop the wheel A, the sleeve $q$ is lowered to its full extent by the ring $w$, so that the ring $g$ is moved by the cone $o$ to its central position or concentric with the shaft $c$, when the vanes $d$ will be closed to the action of the wind, as before mentioned, and shown in Fig. 5.

The object of dividing the cone $o$ into two parts, as shown, is that when the cone $o$ descends onto the ring $g$ at its point of contact with the shaft $c$ the small end of the cone $o$ on that side is unable to pass between the ring $g$ and shaft $c$; but by the continued lowering of the outer sleeve $q$ the divided part of the cone $o$ opposite to that part which is stopped by the ring $g$ falls independently into the opening of the ring $g$, the lower flange of the sleeve $q$ meanwhile falling away from the head $p'$ of the stopped part of the cone $o$ until in the course of rotation this stopped part in turn falls into the opening of the ring $g$ and operates conjointly with the other part on the ring $g$.

By this invention the wind-wheel A is rendered extremely sensitive and operative by the lightest wind, friction of the parts is reduced, and the maximum power obtained.

What I claim as my invention, and desire to secure by Letters Patent, is—

1. In a wind-wheel mounted on a vertical shaft and having peripheral pivoted vanes, the combination of a ring surrounding, but unconnected with, and laterally adjustable to the said shaft, rods connecting the ring to the vanes respectively, and means for supporting the said ring, substantially as described.

2. In a wind-wheel mounted on a vertical shaft and having peripheral pivoted vanes, the combination of a ring surrounding, but unconnected with, and laterally adjustable to the said shaft, rods connecting the ring to the vanes respectively, the said rods being alined tangentially to the shaft, and means for supporting the ring, substantially as described.

3. In a wind-wheel mounted on a vertical shaft, the combination of a ring surrounding, but unconnected with, and laterally adjustable to the said shaft, and oppositely-inclined rods attached to the ring and movably dependent from the wheel, substantially as described.

4. In a wind-wheel mounted on a vertical shaft, and having peripheral pivoted vanes, the combination of a ring surrounding, but unconnected with, and laterally adjustable to the said shaft, the said ring having upper facial projections, rods connecting the ring to the vanes respectively, and means for supporting the ring, substantially as described.

5. In a wind-wheel mounted on a vertical shaft and having peripheral pivoted vanes, the combination of a ring surrounding, but unconnected with, and laterally adjustable to the said shaft, rods connecting the ring to the vanes respectively, means for supporting the ring, a sectional cone adjacent to the ring and adapted to slide longitudinally on the said shaft, and means for applying the centrifugal force of the wheel to reciprocate the cone, substantially as and for the purpose described.

6. In a wind-wheel mounted on a vertical shaft and having peripheral pivoted vanes, the combination of a ring surrounding, but unconnected with, and laterally adjustable to the said shaft, rods connecting the ring to the vanes respectively, means for supporting the ring, a sectional cone adjacent to the ring and adapted to slide longitudinally on the said shaft, and means for moving the cone to and from the ring, substantially as described.

JOHN FLETCHER FORD.

Witnesses:
EDWARD W. FURRELL,
I. L. BROKAW.